(12) United States Patent
Bieler et al.

(10) Patent No.: US 9,872,440 B2
(45) Date of Patent: Jan. 23, 2018

(54) HANDHELD POWER TOOL

(71) Applicant: FELCO MOTION SA, Les Geneveys-sur-Coffrane (CH)

(72) Inventors: Thierry Bieler, Echichens (CH); Laurent Cardoletti, Villeneuve (CH); Christian Fleury, Bellerive (CH); Christian Koechli, Yvonnand (CH); Simon Tinguely, Lausanne (CH)

(73) Assignee: Felco Motion SA (CH)

( * ) Notice: Subject to any disclaimer, the term of this patent is extended or adjusted under 35 U.S.C. 154(b) by 79 days.

(21) Appl. No.: 14/396,795

(22) PCT Filed: May 3, 2013

(86) PCT No.: PCT/EP2013/059316
§ 371 (c)(1),
(2) Date: Oct. 24, 2014

(87) PCT Pub. No.: WO2013/164480
PCT Pub. Date: Nov. 7, 2013

(65) Prior Publication Data
US 2015/0113811 A1   Apr. 30, 2015

(30) Foreign Application Priority Data

May 4, 2012 (CH) ......................... 616/12

(51) Int. Cl.
*A01G 3/037* (2006.01)
*B26B 13/00* (2006.01)

(52) U.S. Cl.
CPC .............. *A01G 3/037* (2013.01); *B26B 13/00* (2013.01)

(58) Field of Classification Search
CPC .................. A01G 3/037; B26B 13/00
See application file for complete search history.

(56) References Cited

U.S. PATENT DOCUMENTS

| 5,002,135 | A | * | 3/1991 | Pellenc | A01G 3/037 173/170 |
| 5,365,155 | A | * | 11/1994 | Zimmermann | H01H 9/06 318/268 |
| 8,089,247 | B2 | | 1/2012 | Pellenc | |
| 8,547,066 | B2 | * | 10/2013 | Bieler | H02J 7/0013 320/112 |
| 8,656,597 | B2 | * | 2/2014 | Pellenc | A01G 3/037 30/194 |
| 8,813,370 | B2 | | 8/2014 | Pellenc | |
| 9,120,235 | B2 | * | 9/2015 | Maniwa | B26B 15/00 |
| 2004/0200628 | A1 | | 10/2004 | Schmitzer et al. | |
| 2008/0042607 | A1 | | 2/2008 | Miyazaki et al. | |
| 2009/0241351 | A1 | * | 10/2009 | Maniwa | B26B 15/00 30/228 |
| 2011/0056082 | A1 | * | 3/2011 | Nie | A01G 3/037 30/228 |
| 2011/0147026 | A1 | | 6/2011 | Pellenc | |
| 2011/0185579 | A1 | | 8/2011 | Pellenc | |

(Continued)

FOREIGN PATENT DOCUMENTS

| DE | 8814543 U1 | 1/1989 |
| EP | 1207016 A | 5/2002 |

(Continued)

*Primary Examiner* — Hwei C Payer
(74) *Attorney, Agent, or Firm* — Blank Rome LLP

(57) ABSTRACT

A power hand tool comprises a trigger (23), a motor (22), a blade (25) driven by the motor (22), and electronic circuit (10) for controlling the angular position or the speed of the motor (22) on the basis of the instantaneous position of the trigger (23). The electronic circuit (10) is arranged to detect a predefined movement sequence of the trigger (23) and to execute a function in response to the detection of such a sequence.

17 Claims, 3 Drawing Sheets

(56) References Cited

U.S. PATENT DOCUMENTS

| | | | |
|---|---|---|---|
| 2011/0254472 A1 | 10/2011 | Forster et al. | |
| 2012/0118595 A1 | 5/2012 | Pellenc | |
| 2012/0304280 A1* | 11/2012 | Hayashida | G06F 21/6218 726/16 |
| 2015/0113811 A1* | 4/2015 | Bieler | B26B 13/00 30/228 |
| 2017/0246719 A1* | 8/2017 | Pellenc | B23Q 17/24 |

FOREIGN PATENT DOCUMENTS

| | | |
|---|---|---|
| EP | 1 574 125 | 9/2005 |
| EP | 1574125 A1 | 9/2005 |
| EP | 1842632 A1 | 10/2007 |
| EP | 2 045 050 | 4/2009 |
| EP | 2 156 732 | 2/2010 |
| EP | 2156732 A1 | 2/2010 |
| EP | 2 163 853 | 3/2010 |
| EP | 2163853 A1 | 3/2010 |
| EP | 3 141 356 A1 * | 3/2017 |
| EP | 3 141 357 A1 * | 3/2017 |
| FR | 2862558 A1 | 5/2005 |
| FR | 2920683 A1 | 3/2009 |
| JP | 2002160180 A | 6/2002 |
| JP | 2004-314298 | 11/2004 |
| JP | 2008-022757 | 2/2008 |
| JP | 2008023694 A | 2/2008 |
| JP | 2011-161533 | 8/2011 |
| JP | 2012500726 A | 1/2012 |
| WO | WO 2008/013051 | 1/2008 |
| WO | WO-2012/045332 A1 | 4/2012 |

* cited by examiner

HANDHELD POWER TOOL

REFERENCE DATA

The present application claims priority of the Swiss patent application CH0616/12 of May 4, 2012, the content of which is hereby incorporated by reference.

TECHNICAL FIELD

The present invention relates to a handheld power tool. In accordance with one aspect, the present invention relates to a handheld power tool equipped with a movable cutting blade and a fixed counter blade as well as a trigger for controlling the movement of this blade. In accordance with a further aspect, the present invention relates to a handheld power tool comprising an electronic circuit with a memory making it possible to semi-permanently store operating parameters of the tool.

PRIOR ART

EP1574125 describes a pruning shear as handheld power tool equipped with a trigger for controlling the opening and the closing of the blades. The trigger is equipped with a movable magnet, such that the instantaneous position of the trigger can be determined with the aid of a fixed Hall sensor. Thus, the position of the movable blade of the pruning shear corresponds to the instantaneous position of the trigger.

A similar trigger of which the instantaneous position makes it possible to control the position or the speed of a blade or of another tool movable in rotation or in translation is also used in numerous other handheld power tools.

Numerous handheld power tools further comprise a haptic element, for example a button, a thumbwheel, or another element manipulated with the finger, so as to control an additional function. In the case of a handheld electric pruning shear for example, haptic elements can be used in order to place the tool in sleep mode or to adjust the maximum position of aperture of the blades.

EP2156732 describes a handheld electric pruning shear comprising a double trigger, consisting of a primary trigger for controlling the actuator of the blade and a secondary trigger connected to the primary trigger. The pivoting of the secondary trigger about an articulation makes it possible to activate complementary functions.

However, the manipulation of haptic elements to perform the additional functions requires the release of the trigger. In the case of a heavy tool, it may be necessary to hold the tool with two hands in order to perform this manipulation. Each manipulation therefore interrupts the normal work with the tool and may also create a risk for the user when the user for example has to release his hold in order to manipulate the tool using both his hands.

In addition, the fabrication of a tool equipped with different haptic elements is costly, in particular due to the wiring of these different elements. On the other hand, the reprogramming of the functions assigned to each haptic element is not generally possible.

In accordance with one aspect of the invention, there is a need for a handheld power tool that avoids the above disadvantages associated with the manipulation of additional haptic elements in order to perform the additional functions.

EP2163853 describes a handheld power tool in which fixed magneto-resistive sensors cooperate with magnets of oriented magnetization in order to control the movements of the movable blade by means of the movements of the trigger.

US2011056082 describes a handheld power tool in which a switch belonging to the body of the tool allows the user to select either a program in which, once the trigger has been pressed once, the movable blade closes against the fixed blade, returns into its initial position, closes again with the fixed blade, returns again into its initial position, etc. continuously without pressing each time on the trigger, or a program in which, when the trigger is pressed, the movable blade closes against the fixed blade, but once this pressing of the trigger is released, the movable blade returns into its initial position and does not move further; only once the trigger has been pressed again does the movable blade again close against the fixed blade.

In addition, handheld power tools equipped with an electronic circuit with a semi-permanent memory for storing data concerning the use of this tool are also known. For example, such data comprises the number of cuts performed with a handheld electric pruning shear, the usage time of the tool, and other data associated with each cut; this data can be used for example by the after-sales service in order to check the use of the tool.

Handheld electric pruning shears and also other tool require a significant battery capacity in order to ensure the autonomy of said tools; these batteries are often stored in a backpack connected to the handheld tool, by a power cable. It is desirable to also arrange the electronic supply circuit of the motor of the pruning shear in this backpack so as to reduce where possible the weight and the bulk of the handheld tool. In this case, the electronic circuit in the backpack generates power supply signals of the motor of the pruning shear on the basis of position signals of the trigger received from the pruning shear.

The after-sales service sometimes wishes to also access the data determined by the electronic supply circuit of the motor, for example in order to check the current generated over each phase or overall. With this objective, it is advantageous to provide a semi-permanent memory in order to save data that concerns the use of the pruning shear and that is determined by the electronic supply circuit of the motor.

In accordance with a further aspect of the invention, there is thus a need for a handheld power tool equipped with one or more separately arranged batteries and storage means so as to access data that concerns the use of the tool and that is determined both in the handheld tool and in the separately remote control electronics.

BRIEF SUMMARY OF THE INVENTION

In accordance with a first aspect of the invention, these objectives are achieved in particular by means of a handheld power tool comprising a trigger; a motor; a tool driven by said motor; an electronic circuit for controlling the angular position and/or the speed of the motor on the basis of the instantaneous position of the trigger; in which the electronic circuit is configured to detect a predetermined movement sequence of the trigger and to execute a function in response to the detection of such a sequence.

This feature thus makes it possible to execute one or more additional functions by actuating the trigger, without having to provide and then manipulate an additional haptic element or an additional trigger. The cost of the tool can thus be reduced. In addition, the access to the additional functions can be provided without releasing the trigger and without having to use the second hand, which is quicker and less dangerous.

Different movement sequences of the trigger can be envisaged in order to execute additional functions. Advantageously, these sequences are unlikely to occur during normal use of the trigger and thus result necessarily from a deliberate and voluntary action on the part of the user wishing to execute an additional function instead of using the tool normally.

In one embodiment, a first predetermined movement sequence comprises a succession of two presses on the trigger during a first period below a first predetermined threshold (T1). This movement corresponds to a quick double-click.

A second predetermined movement sequence comprises a succession of two presses on the trigger during a period below a first predetermined threshold (T1) followed by a holding of the pressed trigger during a period above a second predetermined threshold (T2).

A third predetermined movement sequence comprises a succession of two presses on the trigger during a period below a first predetermined threshold (T1) followed by a holding of the pressed trigger during a period above a third predetermined threshold (T3). The third threshold can be longer than the second threshold (T2) in order to distinguish between the introduction of a second command and the introduction of a third command.

In order to make the introduction of commands more intuitive, an acoustic signal, for example a beep, can be generated when a command has been recognized. The acoustic signal generated may be dependent on the recognized command.

One of the functions executed in response to the detection of a predetermined sequence may comprise the modification of the angle of aperture of the movable blade in the open position relative to the counter blade.

One of the functions executed in response to the detection of a predetermined sequence may comprise the release of the blade in order to manually adjust the crossing thereof relative to the counter blade.

One of the functions executed in response to the detection of a predetermined sequence may comprise the switching of the handheld power tool into sleep mode.

The handheld power tool is advantageously equipped with a mechanically simple trigger which enables just two manipulations: pressing the trigger; or releasing the trigger so that it resumes its initial position under the action of a spring or an equivalent element. There is no need to modify the trigger in order to detect commands for introducing additional functions. An electronic circuit determines at each moment the instantaneous position of the trigger, for example by means of a magnetic sensor, then uses a succession of successive instantaneous positions in order to determine whether the movement of the trigger corresponds to a predetermined sequence before triggering the execution of an additional function.

The specific movements of the trigger are advantageously detected by a processor, which executes a computer program in order to detect whether a movement sequence corresponds to a predetermined pattern, and which, in this case, executes a specific function corresponding to this predetermined movement. It is thus possible to modify at any moment, by means of programming, the functions associated with a predetermined movement and/or to detect further predetermined movements in order to execute specific additional functions.

In accordance with a further aspect of the invention, which may be independent of the first aspect or combined with one or more aspects above, a handheld power tool comprises a handheld assembly, a power block and a power and data cable connecting said handheld power tool to the power block. The handheld assembly comprises a motor, a tool driven by this motor, and a first electronic circuit with a semi-permanent memory for storing first data that concerns the use of the handheld assembly and that is determined in this handheld assembly. The power block comprises a battery, or a number of batteries independent of one another, and a second electronics circuit for controlling the angular position or the speed of the motor. The second electronic circuit is configured to determine second data concerning the use of the handheld assembly and for storing said second data in said semi-permanent memory by transmitting the second data via the power and data cable.

In this text, the term "semi-permanent memory" means a memory in which written data are stored, even when the power supply is interrupted, until said data are voluntarily deleted. The semi-permanent memory may be of the flash type, EProm type, EEProm type, MRAM type, hard drive type, etc., for example.

This solution in particular has the advantage of storing, in a semi-permanent memory in the handheld assembly, data concerning the use of this handheld assembly, said data being determined both in the handheld assembly itself and in the electronic circuit of the power block. Thus, even if the handheld assembly is used with a different power block or with a different electronic control circuit, the data concerning the use of this handheld assembly remains stored in the handheld assembly itself, independently of the location in which the data was determined.

The first data determined in the handheld assembly and concerning the use of the handheld assembly may comprise, for example, the number of actuations of the trigger. This data can be determined for example by a circuit for determining movements of the trigger.

The second data determined in the power block and concerning the use of the handheld assembly may comprise, for example, data determined following the measurement of the supply current of the phases of the motor of the handheld assembly. This data can be determined for example by the supply circuit of the motor and can be transmitted to the handheld assembly via the power cable and data cable in order to be saved there.

The second electronic circuit forming part of the power block may comprise a second semi-permanent memory in order to store there data concerning the use of one power block.

The battery may comprise a battery management circuit for managing the charge and/or the discharge of the battery. The battery management circuit may comprise a third semi-permanent memory for storing there data concerning the use of the battery.

The invention also relates to a method for introducing commands into a handheld power tool having a trigger.

BRIEF DESCRIPTION OF THE FIGURES

Examples of implementation of the invention are indicated in the description illustrated by the accompanying figures, in which.

EXEMPLARY EMBODIMENT(S) OF THE INVENTION

In the following description provided by way of example, reference will be made, for reasons of simplicity, to a pruning shear. However, it goes without saying that the invention is not limited to such a tool, but also includes all the tools covered by the claims. The invention also is not limited to agriculture, but also includes, for example, shears, pincers or presses for industrial and medical applications and for applications in any other field.

Figure 1:
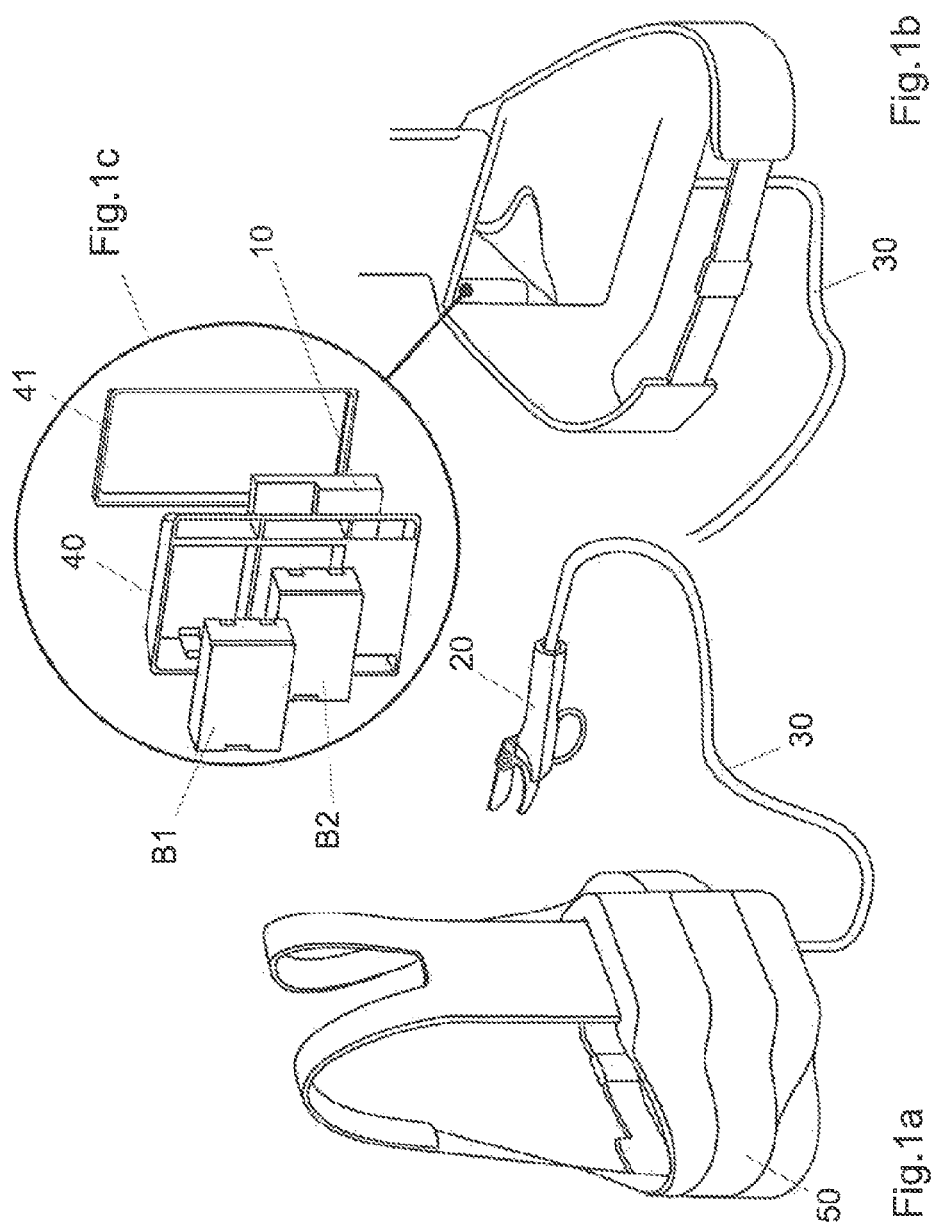
FIGS. 1a to 1c illustrate an overall view of a handheld power tool connected by a cable to a power block.
Figure 2:
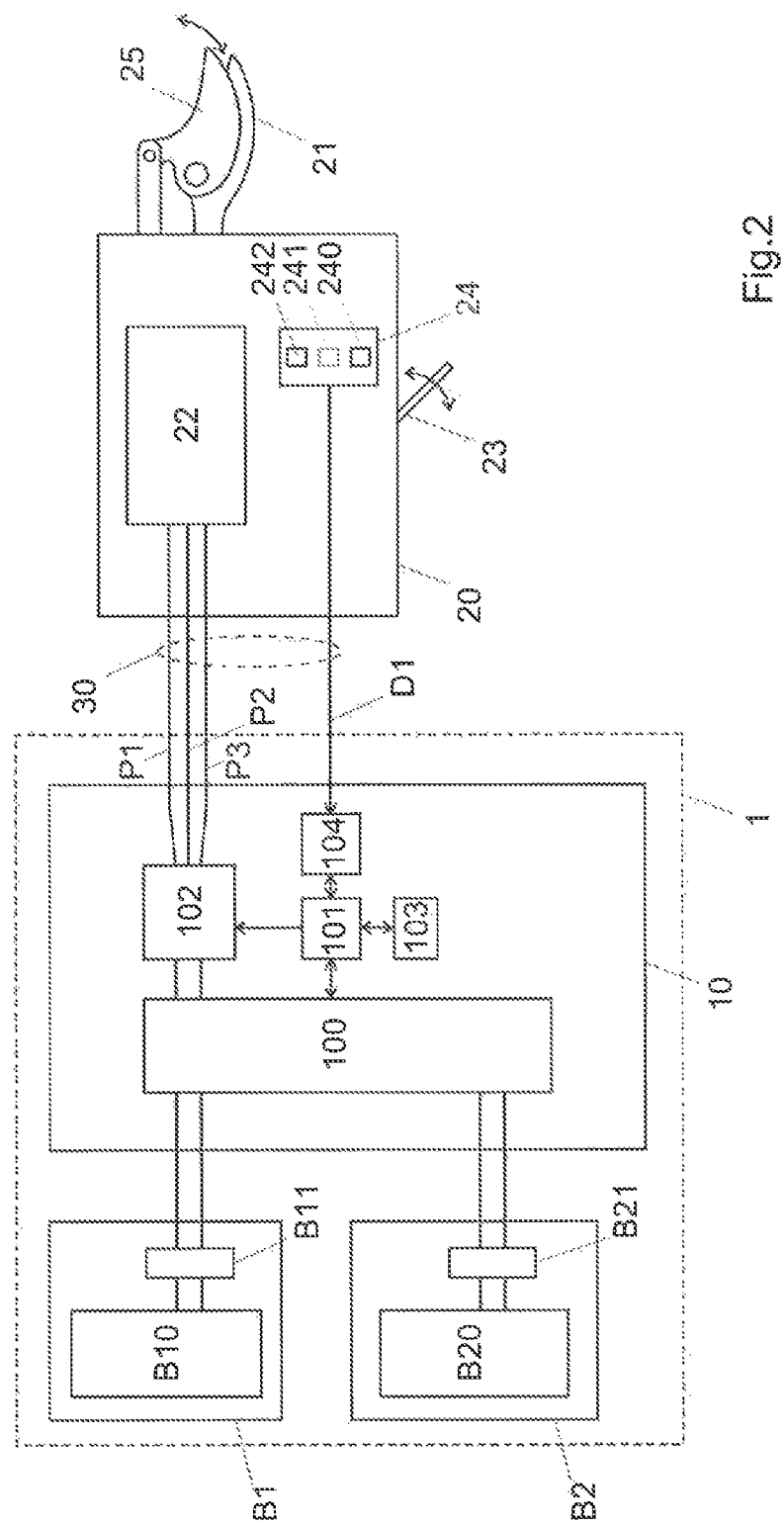
FIG. 2 is a block diagram of the main electrical or electronic components of the handheld power tool.

The handheld power tool illustrated in FIGS. 1a to 1c and illustrated in the form of a block diagram in FIG. 2 on the one hand comprises a handheld assembly 20 generating the mechanical action of the tool and on the other hand a power block 1 connected to the handheld assembly 20 by a power and data cable 30. The handheld assembly 20 is formed in this example by an electric pruning shear with a fixed counter blade 21 and a movable blade 25 actuated by an electric motor 22, as illustrated in FIG. 2. The position of the movable blade 25 is determined by the operator by acting on a trigger 23, of which the instantaneous position is determined with the aid of a first electronic circuit 24 configured to detect at all times the position of the trigger and to generate signals representative of the position and/or movements of this trigger. In a typical embodiment, the movable blade 25 pivots under the action of the motor 22 so as to draw close to the fixed blade when the trigger 23 is pressed and move away from the fixed blade so as to open the pruning shear when the trigger is released.

Figure 3:
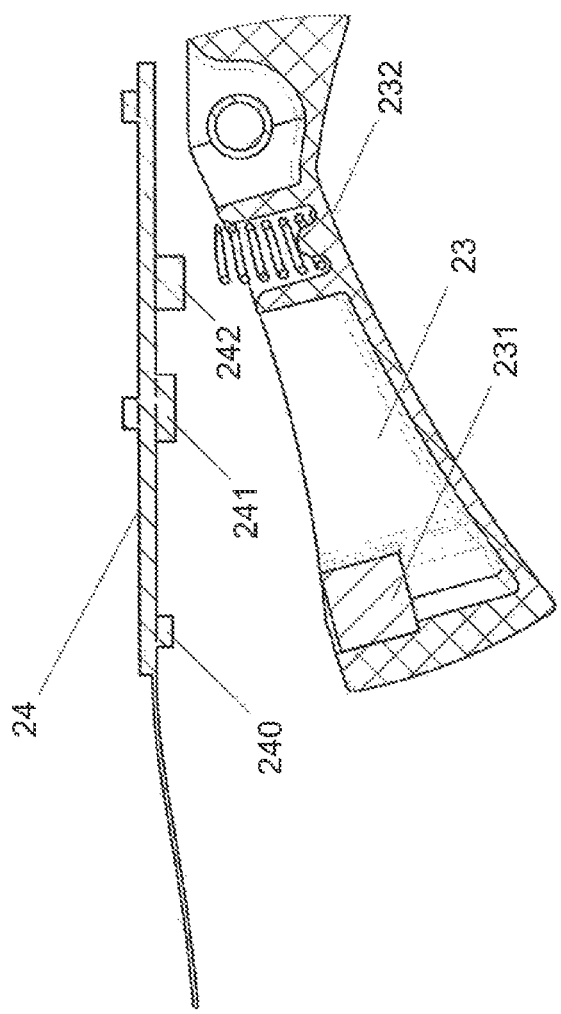
FIG. 3 is a detailed view of a trigger of the handheld power tool.

FIG. 3 illustrates a sectional view of an exemplary trigger 23 according to the invention. The trigger comprises a spring 232 for pushing the trigger into a rest position when it is released. In this example, the first electronic circuit 24 makes it possible to determine the instantaneous position of the trigger 23 by means of a movable magnet 231 connected to the trigger and whose magnetic field is measured by a Hall sensor or a fixed magneto-resistive sensor 240 connected to the body of the pruning shear and mounted on a printed circuit. Other systems for detecting the instantaneous position of the trigger can be conceived, including systems based on a potentiometer, inductive, capacitive or optical systems, or magnetic systems comprising a different arrangement of fixed and movable components.

The power block 1 is intended to be carried by the user, for example in a backpack 50. On the one hand, it comprises one or more batteries B1, B2, . . . , Bx and on the other hand a second electronic circuit 10 for generating supply voltages of the motor 22 over the bi-phase or tri-phase supply conductors P1, P2, P3. It is also possible within the scope of the invention to include all or some of the elements of the power block 1 in the handheld assembly 20. Advantageously, the batteries B1, B2, . . . , BX and the second electronic circuit 10 are each equipped with an individual casing and can thus be assembled and mounted individually in the backpack 50; the number of batteries can be adapted by the user in order to increase the autonomy of the tool or conversely to reduce the weight of the bag. Removable electrical connectors make it possible to connect these components to one another and to the handheld element.

The batteries B1, B2, . . . , Bx for example include rechargeable cells B10, B20, . . . , for example of the lithium-ion or lithium-polymer type. Each battery also includes an electronic circuit for managing the battery B11, B21, . . . , B2x in order to control the charge and discharge of the cells; the electronic management circuit, which forms part of the power block 1, in particular makes it possible to limit the current and to protect the battery if its output terminals are short-circuited. The electronic management circuit may also include a semi-permanent memory (not shown; referred to hereinafter as the third semi-permanent memory) in order to store there data concerning the use of the battery, for example the number of charge and discharge cycles, the maximum voltage at which the battery can be charged, etc.

The battery or batteries B1, B2, . . . , Bx can be connected in parallel to the second electronic circuit 10 via removable connectors. A supply circuit 100 as an element of the second electronic circuit 10 generates a stable voltage source on the basis of the voltages provided by the different batteries; this circuit preferably allows the connection in parallel of a number of batteries having charge voltages different from one another.

The component 102 ("driver") is an electronic circuit fed by the supply 100 and which at all times generates the signals P1, P2, P3 over the different supply phases of the motor 22. The voltage produced at all times is determined by a processor 101 on the basis of control signals originating from the handheld element 20 and dependent in particular on the instantaneous position of the trigger 23 and/or other data signals originating from the handheld element 20. The processor 101 controls the circuit 102 in such a way that the position of the movable blade 25 corresponds at all times to the instantaneous position of the trigger 23.

The cable 30 connecting the handheld element 20 to the power block 1 comprises one or more data conductors D1, and in addition phase conductors already mentioned. In order to reduce the number of conductors, the data signals could be multiplexed in another embodiment over the supply signals. In the illustrated example, a communication circuit 104 in the second electronic circuit 10 sends and receives digital data over one or more data conductors D1; the handheld element 20 for its part comprises a corresponding communication circuit 241 for receiving and sending data over the data conductor(s) D1. The circuits 104 and 241 for example use the CAN communication protocol for exchanging data.

The handheld element 20 can thus exchange data and communicate with the second electronic circuit 10 via the conductor D1. However, no communication is provided between the batteries B1 and the handheld element. The batteries, although equipped with their electronics B11, B21, do not receive any data concerning the state or the configuration of the handheld assembly 20. Conversely, the handheld assembly 20 does not receive any information concerning the state of the batteries B1, B2, BX.

The first electronic circuit 24 makes it possible to determine the instantaneous position of the trigger 23 and to exchange data with the second electronic circuit 10 so as to transmit thereto this instantaneous position or a piece of information derived from this instantaneous position. For example, the electronic circuit assembles on a common printed circuit a position sensor 240, for example a Hall sensor, a magneto-resistive sensor, or any other sensor capable of determining the instantaneous position of the trigger 23. The element 241 already described is a circuit for communicating with the second electronic circuit 10. The component 242 is a semi-permanent memory in which data concerning the use of the handheld assembly, as determined both in the handheld assembly and in the second electronic circuit, are saved. Further components, including a processor, can be provided as elements of the first electronic circuit on the same printed circuit in the handheld assembly.

In accordance with an aspect of the invention, the semi-permanent memory 242 makes it possible to save:

- on the one hand data concerning the use of the handheld assembly 20 and determined by this handheld assembly. This data includes, for example, the number of actuations of the trigger 23 since the operation of the tool, the usage time of the tool, the number of predetermined specific movements of the trigger, and/or other data determined by the first electronic circuit 24, including for example data of the statistical type concerning the use of the tool, and/or data concerning the introduced commands, and/or data concerning positions or speeds of movable components of the handheld assembly, etc., and/or the position of mechanical stops in order to brake movable parts before they contact these mechanical stops. In a variant, this data includes the front and/or or rear position of mechanical stops in order to pair the electronic part of the tool with the mechanical part. In another variant, this data also includes the position of the zeros of the sensor or sensors 240, in particular in the case in which this/these sensor/sensors is/are Hall sensors. Data from other sensors, not shown, which can be provided in the handheld assembly can also be saved;
- on the other hand, data concerning the use of the handheld assembly 20 and determined by the second electronic circuit 10 in the power block 1. This data includes, for example, data determined by the processor 101 and/or by the circuit 102, which generates at all times the signals P1, P2, P3 over the different supply phases of the motor 22. For example, this data may include or be dependent on the current and/or the voltage transmitted to the different phases of the motor, for example including the speed of rotation of the motor 22, the torque provided by this motor, or other data making it possible to determine this speed or this torque, for example including data of the statistical type concerning the use of the tool, and/or data concerning the introduced commands, and/or data concerning positions or speeds of movable components of the handheld assembly, etc.

The semi-permanent memory 242 thus collects all the data concerning the use of the handheld assembly, even if some of this data has been determined, that is to say measured, in the separate power block. In this way, the after-sales service can access all data concerning the use of this handheld assembly by reading this memory 242, even if this handheld assembly has been used with different power blocks. In a variant, the data concerning the use of the handheld assembly and stored in the memory 242 cannot be reset to zero by the user: the after-sales service can thus access all the data of the tool.

In another variant, the after-sales service accesses this data with the aid of an online program by connecting the second electronic circuit 10 to a computer via a USB port, for example.

The second electronic circuit 10 may comprise its own semi-permanent memory 103 for saving there data concerning the use of this circuit; some of this data can be the same as that transmitted to the handheld assembly. In this way, the after-sales service can access all data concerning the use of this second electronic circuit by reading this memory 103, even if this second electronic circuit 10 has been used with different handheld assemblies 20. The data, or some of this data, may advantageously be reset to zero by the user, without influencing the data saved in the handheld element. For example, the statistics possibly stored in the circuit 10 and concerning the number of actuations of the handheld assembly can be deleted advantageously by the user, since an electronic circuit can be used by different users.

In accordance with a further aspect of the invention, the processor 101 in the second electronic circuit 10 and/or a processor (not illustrated) in the handheld assembly executes a program making it possible to detect predetermined movement sequences of the trigger 23 and to execute a function in response to the detection of such a sequence. This processor thus advantageously makes it possible to detect unusual movement sequences, which are unlikely to occur when the trigger 23 is manipulated to use the tool 20 or for example to cut branches, and which are thus interpreted as additional functional execution commands.

In one embodiment, the processor 101 or a processor in the handheld assembly is configured to detect movement sequences of the trigger comprising two actuations of the pressed trigger quickly during a period below a threshold T1. For example, the threshold T1 is below 2 seconds, preferably below one second. This sequence is referred to as a double-click. It triggers a command for controlling the maximum aperture of the movable blade with respect to the counter blade. A first double-click on the trigger causes the blade to pass from a maximum aperture angle with respect to the counter blade when the trigger is released to a reduced aperture angle; an acoustic beep is generated. A second double-click on the trigger 23 causes the blade to return to a maximum aperture position of the blade in the open position when the trigger is released; an acoustic beep is also generated. The reduced aperture position of the blades 21, 25 corresponds for example to an angle between 30 and 70% of the aperture angle in the position of maximum aperture; advantageously, this reduced aperture angle can be adjusted, for example at the second electronic circuit.

In one embodiment, the processor 101 or a processor in the handheld assembly is configured to detect movement sequences of the trigger comprising two actuations of the trigger quickly pressed during a maximum period T1, followed by a holding of the pressed trigger during a second period above a second threshold T2. This sequence is referred to as a double-click with short hold. It switches the tool into sleep mode so as to reduce the electrical consumption. A first beep is generated after the double-click (as in the case above), a second beep, which may be different from the first beep, is generated after the period of time T2. In is possible to quit this sleep mode simply by pressing again on the trigger.

In one embodiment, the processor 101 or a processor in the handheld assembly is configured to detect movement sequences of the trigger comprising two actuations of the trigger quickly pressed during a maximum period T1, followed by a holding of the pressed trigger during a second period above a third threshold T3, which is longer than the second threshold T2. This sequence is referred to as a double-click with long hold. It causes the movable blade 2b to close again by making said blade occupy different successive closing positions in accordance with a cycle; when the trigger is released, the pruning shear saves the selected position of closure, which allows the user to select, from the plurality of predetermined positions, the position in which the fixed blade 21 and the movable 25 cross.

A first beep is generated after the double-click (as in the case above), a second beep, which is different from the first beep, is generated after the period of time T2, and a third beep is generated after the period of time T3.

In a variant, the acoustic beeps can be replaced or accompanied by a LED or any other flashing light source. In a further variant, LEDs or light sources of different colors can be associated with the different thresholds T1 to T3.

Further specific movement sequences of the trigger can be detected and used in order to introduce commands and execute auxiliary functions. For example, a long hold of the pressed trigger (without prior double-click), triple-clicks, etc. can also be used in order to introduce controls without, releasing the trigger.

Advantageously, the movable blade 25 does not move during the introduction of at least one type of command by means of predetermined movements of the trigger 23. In a further embodiment, the movable blade moves into a predetermined position, independent of the instantaneous position of the trigger, for example into a closed position, when at least one type of command is introduced by means of a predetermined movement of the trigger 23.

The invention claimed is:

1. A handheld power tool comprising:
   a single trigger, said single trigger consisting essentially of only one pivoting axis, said single trigger being arranged to pivot around said pivoting axis;
   a motor;
   a blade driven by said motor;
   an electronic circuit for executing a function that controls the angular position or the speed of said motor on the basis of the instantaneous position of said single trigger resulting from pivoting around said pivoting axis, so as to control the angular position or the speed of said blade driven by said motor on the basis of the instantaneous position of said single trigger resulting from pivoting around said pivoting axis;
   wherein said electronic circuit is configured to detect a predetermined movements sequence of said single trigger and to execute an additional function in response to the detection of such a sequence, said additional function being different from controlling the angular position of said motor on the basis of the instantaneous position of said single trigger resulting from pivoting around said pivoting axis, said additional function being different from controlling the speed of said motor on the basis of the instantaneous position of said single trigger resulting from pivoting around said pivoting axis.

2. The tool as claimed in claim 1, wherein said electronic circuit is configured to detect a first predetermined movements sequence of said single trigger, said first predetermined movement sequence comprising a succession of two presses on the single trigger during a first period below a first predetermined threshold.

3. The tool as claimed in claim 2, wherein said electronic circuit is configured to detect a second predetermined movements sequence of said single trigger, said second predetermined movements sequence comprising a succession of two presses on the single trigger during said first period below said first predetermined threshold followed by a holding of the pressed single trigger during a second period above a second predetermined threshold.

4. The tool as claimed in claim 3, wherein said electronic circuit is configured to detect a third predetermined movements sequence of said single trigger, said third predetermined movements sequence comprising a succession of two presses on the single trigger during said first period below the first predetermined threshold followed by a holding of the pressed single trigger during a third period above a third predetermined threshold.

5. The tool as claimed in claim 1, said electronic circuit comprising a processor for detecting said predetermined movements sequence of said single trigger and for executing said function in response to the detection of such a sequence.

6. The tool as claimed in claim 1, said electronic circuit in response to the detection of said predetermined movements sequence of said single trigger, being configured to modify the angle of opening position of the blade relative to a counter blade when said single trigger is released.

7. The tool as claimed in claim 6, said electronic circuit in response to the detection of said predetermined movements sequence of said single trigger, being configured to modify the angle of opening position of the blade relative to the counter blade from a maximum angle of opening position to a reduced angle of opening position, and vice versa.

8. The tool as claimed in claim 7, said electronic circuit being configured so as to adjust said reduced angle of opening position on the basis of an input of a user.

9. The tool as claimed in claim 1, said electronic circuit being configured so as to adjust the position of the blade into a closed position when the single trigger is pressed.

10. The tool as claimed in claim 9, said electronic circuit being configured so as to select the position of the blade into a closed position when the single trigger is pressed from a plurality of positions.

11. The tool as claimed in claim 1, said electronic circuit in response to the detection of said predetermined movements sequence of said single trigger, being configured to switch the tool into sleep mode.

12. The tool as claimed in claim 1, wherein said electronic circuit is a first electronic circuit, the tool comprising:
    a handheld assembly including said single trigger, said motor and said blade driven by said motor, and also said first electronic circuit with a semi-permanent memory for storing first data concerning the use of said handheld assembly determined in said handheld assembly;
    a power block including a second electronic circuit, said second electronic circuit being configured to determine second data concerning the use of said handheld assembly and for storing these second data in said semi-permanent memory of the handheld assembly;
    a power and data cable connecting said handheld assembly to said power block.

13. The tool as claimed in claim 1, said single trigger comprising a single piece.

14. The tool as claimed in claim 1, said single trigger being arranged so as to enable just two manipulations: pressing the single trigger and releasing the single trigger.

15. A method for introducing commands in a handheld power tool, said handheld power tool comprising a motor, said method comprising:
    pressing a single trigger in order to provoke the movement of a movable blade, said single trigger consisting essentially of only one pivoting axis, said single trigger being arranged to pivot around said pivoting axis;
    releasing said single trigger in order to move said movable blade in the opposite direction;
    providing an electronic circuit for controlling the angular position or the speed of said motor on the basis of instantaneous position of said single trigger resulting from pivoting around said pivoting axis so as to control the angular position or the speed of said blade driven by said motor on the basis of the instantaneous position of said single trigger resulting from pivoting around said pivoting axis;

successively pressing the single trigger twice during a period below a first threshold and/or holding said pressed single trigger during a period above a second threshold such that said electronic circuit introduces a command to execute an additional function, said additional function being different from controlling the angular position of said motor on the basis of the instantaneous position of said single trigger resulting from pivoting around said pivoting axis, said additional function being different from controlling the speed of said motor on the basis of the instantaneous position of said single trigger resulting from pivoting around said pivoting axis.

16. The method of claim 15, comprising:
switching the handheld power tool into sleep mode by successively pressing the single trigger twice during a period below the first threshold and/or by holding said pressed single trigger during a period above the second threshold.

17. A method for introducing commands in a handheld power tool, said handheld power tool comprising a single trigger, a motor and an electronic circuit, said method comprising:
pressing said single trigger in order to provoke the movement of a movable blade in a first direction, said single trigger consisting essentially of only one pivoting axis, said single trigger being arranged to pivot around said pivoting axis once it is pressed;
releasing said single trigger in order to move said single trigger in a second direction opposite to the first direction, said single trigger being arranged to pivot around said pivoting axis once it is released;
executing a predetermined movements sequence of said single trigger, by pressing and/or releasing the single trigger so that said single trigger pivots around said only one pivoting axis, said predetermined movements sequence of said single trigger not allowing the movable blade to move;
detecting said predetermined movements sequence of said single trigger by said electronic circuit
executing an additional function in response to the detection of such a sequence, said additional function being different from controlling the angular position of said motor on the basis of the instantaneous position of said single trigger resulting from pivoting around said pivoting axis, said additional function being different from controlling the speed of said motor on the basis of the instantaneous position of said single trigger resulting from pivoting around said pivoting axis.

* * * * *